United States Patent [19]
Brunnnhofer

[11] Patent Number: 5,038,833
[45] Date of Patent: Aug. 13, 1991

[54] FUEL LINE FOR FIXED-LENGTH VEHICLE INSTALLATION

[75] Inventor: Erwin Brunnnhofer, Fuldabrück, Fed. Rep. of Germany

[73] Assignee: Technoform Caprano+Brunnhofer KG, Fuldabruck, Fed. Rep. of Germany

[21] Appl. No.: 65,082

[22] Filed: Jun. 19, 1987

Related U.S. Application Data

[63] Continuation of Ser. No. 842,545, Mar. 21, 1986, abandoned.

[30] Foreign Application Priority Data

Mar. 22, 1985 [DE] Fed. Rep. of Germany ....... 3510395

[51] Int. Cl.$^5$ ............................................. F16L 9/14
[52] U.S. Cl. ................................... 138/137; 138/125; 138/126; 428/36.7; 428/36.91
[58] Field of Search ............... 138/125, 124, 126, 137, 138/140, 141, 118; 428/36, 36.7, 36.6, 36.91

[56] References Cited

U.S. PATENT DOCUMENTS

| | | | |
|---|---|---|---|
| 2,564,602 | 8/1951 | Hurst | 138/125 |
| 2,800,145 | 7/1957 | Peierls et al. | 138/125 X |
| 2,855,975 | 10/1958 | Ritchie et al. | 138/125 X |
| 2,971,538 | 2/1961 | Brumbach | 138/137 X |
| 3,411,981 | 11/1968 | Thomas | 138/141 |
| 3,561,493 | 2/1971 | Maillard et al. | 138/137 X |
| 3,805,848 | 4/1974 | Chrow | 138/137 X |
| 4,243,074 | 1/1981 | Strutzel et al. | 138/137 X |
| 4,244,914 | 1/1981 | Ranalli et al. | 138/137 X |
| 4,330,017 | 5/1982 | Satoh et al. | 138/137 X |
| 4,436,778 | 3/1984 | Dugal | 138/137 X |
| 4,613,532 | 9/1986 | Michael et al. | 138/118 X |

*Primary Examiner*—James E. Bryant, III
*Attorney, Agent, or Firm*—Herbert Dubno

[57] ABSTRACT

A fixed-length fuel line, for automotive vehicles to be powered by an alcohol-containing fuel such as gasohol, has a relatively thick polyamide wall which is internally lined by a polyvinyl alcohol based alcohol-barrier layer protected against the fuel by a water-barrier layer, e.g. of polyamide, the line being constructed so that swelling of the water-barrier layer does not change the length of the line because any swelling stress is taken up by the thicker polyamide wall.

13 Claims, 2 Drawing Sheets

FUEL LINE FOR FIXED-LENGTH VEHICLE INSTALLATION

This is a continuation of application Ser. No. 842,545, filed on Mar. 21, 1986, now abandoned.

FIELD OF THE INVENTION

My present invention relates to a fuel line, especially a fixed-length fuel line for installation in an automotive vehicle and, more specifically, to a fuel line of the type in which a tube is extrusion-pressed from a synthetic resin with a polyamide wall.

BACKGROUND OF THE INVENTION

Fuel lines composed of synthetic resin have been produced heretofore by extrusion-pressing for conducting normal gasoline or high-test or supergasoline from the gasoline tank or reservoir of the vehicle to an internal combustion engine.

Such lines, which generally have lengths of at least several meters, must be provided with narrow tolerances for both the installation of the line in the vehicle and for the proper functioning thereof. Furthermore, it is important, once the line has been installed, that it not change materially in length during operation, either by shrinkage or elongation or as a result of the stresses to which the line may be subject in use. Shrinkage once the ends of the line are fixed, for example, can result in breakage. Elongation can cause bowing of the line where such bowing may be hazardous to continued operation because it may bring the line into proximity of a dangerous condition or result in kinking.

Not unsurprisingly, conventional fuel lines fullfil these requirements when they are used for ordinary gasoline or super-gasolines.

When, however, the fuel contains alcohol, i.e. is a gasohol, and especially when the alcohol is methanol, even the conventional gas lines which normally do not undergo length changes, are found to be subject to detrimental length changes such that the length may increase some 4 to 5% and some 10 to 20 cm in extreme cases.

Since conventional extruded synthetic resin tubes using polyamide walls in contact with the fuel cannot be employed because of these length changes, it has been customary for vehicles which were predominantly to be fueled by normal gasoline or supergasoline admixed with alcohol, to substitute metal fuel lines.

However, metal fuel lines are subject to corrosion by alcohol-containing fuel, internally as well as subject to external corrosion, the internal corrosion apparently being a result of the strong hygroscopic character of the alcohols so that it is practically impossible to ensure that the alcohol in the fuel will not carry along at least some water.

However, with the increasing need for replacement of lead-containing gasolines, and especially supergasolines with lead-free supergasoline, the need to admix alcohol with the gasoline for good antiknock properties are increased. These factors also apply to Diesel fuels in cases in which alcohol must be added thereto for various reasons.

Up to now, therefore, compromises were required with respect to the fuel lines used and the fuel employed.

OBJECTS OF THE INVENTION

It is the principal object of the present invention to provide a fixed-length fuel line for an automotive vehicle which can be utilized effectively for fuels containing alcohol and, of course, for fuels without alcohol, and which does not suffer detrimental length changes and which can be used effectively for long periods of time with even supergasolines containing 5% and more alcohol.

Another object of this invention is to provide a fuel line which overcomes the drawbacks outlined previously.

SUMMARY OF THE INVENTION

These objects and others which will become apparent hereinafter are attained, in accordance with the invention, in an extruded polyamide-wall fuel line which is lined on its side exposed to the fuel, i.e. internally, with an alcohol-blocking or barrier layer which is preferably of a polyvinyl-alcohol base and which, in turn, is lined on its side turned toward the lumen or flow cross section of the tube with a water-barrier layer of a polyamide base. The polyamide wall, alcohol-barrier layer and water-barrier layer are preferably coextruded in mutually bonded relationship and the polyamide wall has a wall thickness sufficient to prevent the swelling of the water-barrier layer resulting from alcohol pickup from distorting the tube or pipe or increasing the length thereof.

I have found that the polyamide wall should preferably be a polyamide 11 or polyamide 12 according to German Industrial Standard (DIN) 7728 (nylon 11 or nylon 12).

Since the polyamide wall, the alcohol-barrier layer and the water-barrier layer are united in bonded relationship by the coextrusion, the polyvinyl alcohol composition serving as the alcohol-barrier layer should be an extrudable polyvinyl alcohol.

According to a feature of the invention, the alcohol-barrier layer is composed of an extrudable copolymer with a sufficient proportion of polyvinyl alcohol and preferably a predominating weight proportion of polyvinyl alcohol. The preferred copolymer is a copolymer of vinyl alcohol and ethylene. The proper proportions for a particular fuel line can be experimentally determined with ease since the sole criteria are extrudability and alcohol-blocking capabilities. Compositions ranging from 65% weight vinyl alcohol to 35% by weight ethylene, to 95% vinyl alcohol plus 5% ethyl, have been found to be effective.

It is not necessary to provide the water blocking or barrier layer from the same polyamide as the polyamide wall, but the extrusion process can be simplified since only two extruders are necessary when both the polyamide wall and the water-blocking layer are composed of the same polyamides. Consequently, the preferred water-blocking layer is polyamide 11 or polyamide 12 of the German Industrial Standard (DIN) 7728 (nylon 11 or nylon 12).

It has been found to be advantageous to provide fuel lines especially for automobile, but also for other vehicles, which have a diameter of 5 to 10 mm, especially about 8 mm, whose polyamide wall has a thickness of 0.75 to 1.25 mm, the blocking or barrier layers having wall thicknesses each of about 10% of the thickness of the polyamide wall. For example, for a fuel line having a diameter of about 8 mm, the wall thickness can be 0.8 mm and the thickness of each barrier-layer coated, this wall can be about 0.1 mm.

The fuel line of the invention can be formed as a hard polyamide structure which thus is rigid and not flexible like a hose. However, it is also possible, by the addition of plasticizers to the polyamide of the wall to form a flexible fuel line. Naturally the wall structure should be self-supporting, i.e. noncollapsible. Imparting at least some flexibility to the fuel line facilitates its mounting.

Surprisingly the presence of the plasticizer does not alter the advantages gained with the invention, namely the elimination of length changes by the detrimental effect of alcohol contained in the fuel upon the polyamide wall so that the assembly of the invention in which the wall is lined with an alcohol barrier and advantageously also with a water barrier, as recited, is stable as to length for conducting fuel-containing gasoline even when the plasticizers are included in the polyamide of the wall and, in the appropriate case, of the water-barrier layer.

The invention is based upon my discovery that the length change of the fuel line witnessed with polyamide fuel lines in the past where alcohol was present in the fuel, was a result of a swelling of the polyamide wall by alcohol which diffused out of the fuel and into the wall.

Experiments have shown that applying a barrier layer which would normally be effective against alcohol to the polyamide wall alone is not effective. Thus when a polyvinyl-alcohol based layer is supplied to the polyamide wall and is in direct contact with the alcohol-containing gasoline, there appears to be still a diffusion of alcohol into the polyamide wall so that the barrier effectiveness of the polyvinyl alcohol layer is less than expected, presumably because a comparatively thin layer is used.

Surprisingly, however, when a further polyamide layer lines the polyvinyl-alcohol layer, even though it also is very thin, there is practically no diffusion of alcohol into the polyamide wall carrying the linings and hence no swelling.

I have found that this internal polyamide layer acts as a water-blocking or water-barrier layer and prevents the diffusion of water into the polyvinyl-alcohol layer. When water does not reach the polyvinyl-alcohol layer and care is taken during the extrusion to be certain that the polyvinyl-alcohol-based layer does not contain trapped water, alcohol-blocking effectiveness of the polyvinyl-alcohol (PVA) based layer is greatly enhanced and acts as an absolute barrier to penetration by alcohol to the polyamide layer.

It is true that the polyamide lining then tends to swell, but it has been found to have no effect in changing the length of the fuel line because the thicker polyamide wall can readily takeup the stress of the swelling forces without shape alteration.

Long term tests have verified these results.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
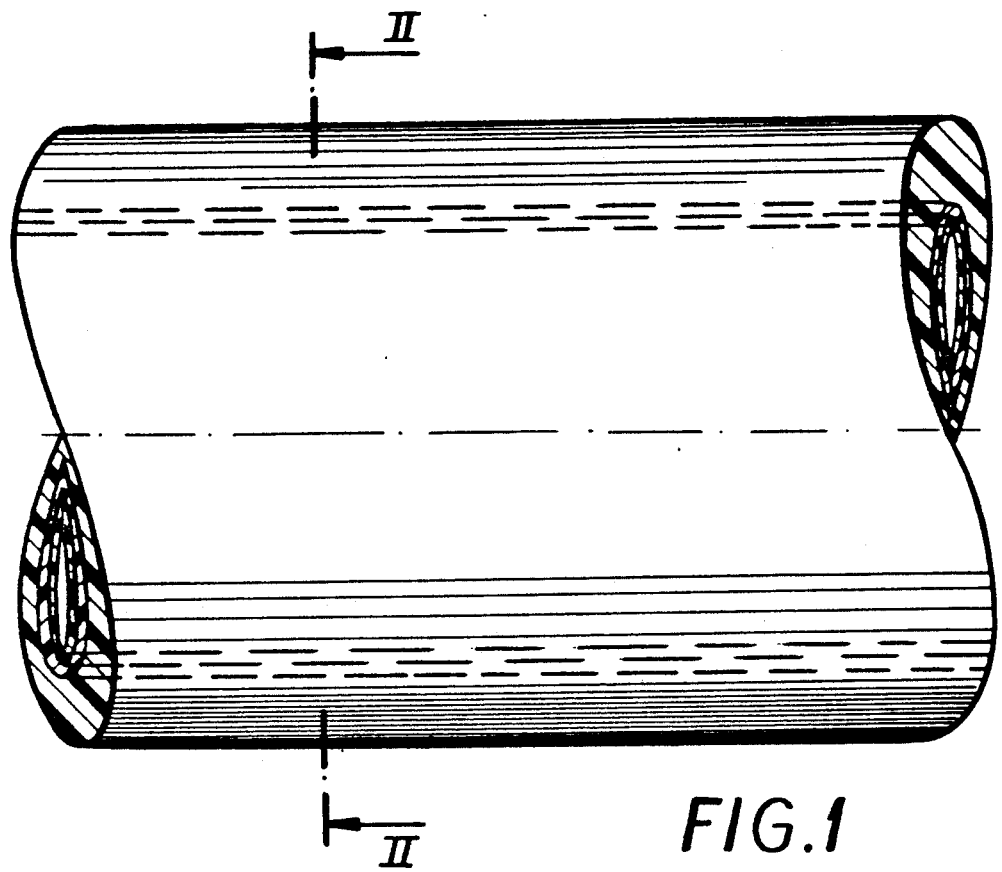
FIG. 1 is an elevational view through a fuel line according to the invention.
Figure 2:
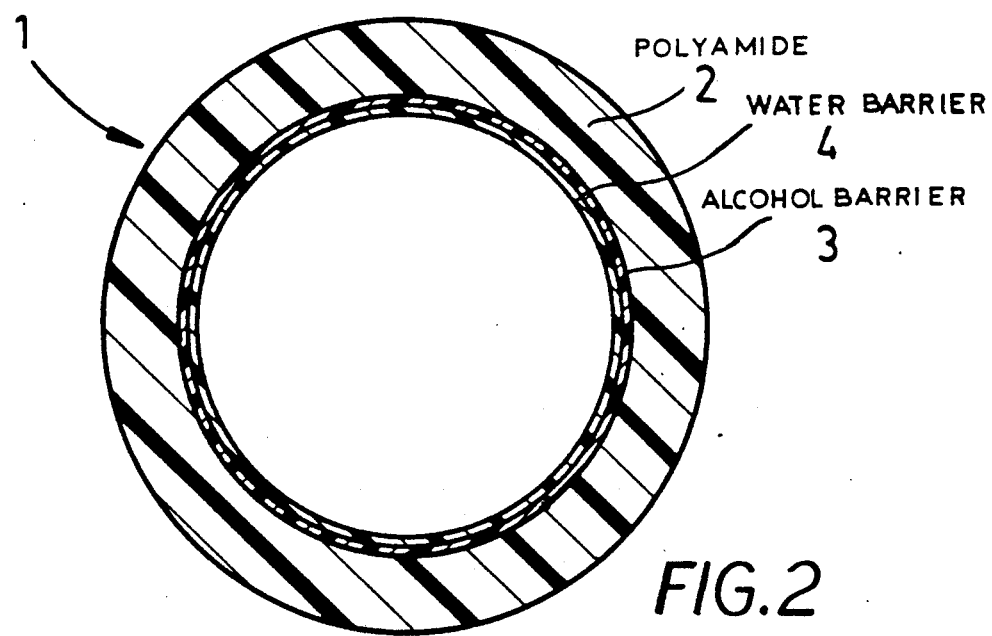
FIG. 2 is a section taken along the line II—II of FIG. 1.

The fuel line shown in the drawing at 1 is fabricated in a given length and is installed in a vehicle in a given length and maintains this length through its life, i.e. is not subject to length changes. It can be used for an automotive vehicle such as a passenger vehicle, to connect a fuel tank for gasohol with an Otto-cycle engine.

The fuel line 1 is fabricated by extrusion pressing and particularly by coextrusion of the two materials from respective worm presses through a common coaxial flow-die as is well known in the art. The coextruded product comprises a polyamide wall 2 internally coated by an alcohol-barrier layer 3 of an extrudable PVA-based composition and which is internally coated by a water-barrier layer 4 of a polyamide base, e.g. the same polyamide composition as the wall 2.

The polyamide wall 2, the alcohol barrier layer 3 and the water-barrier layer 4 are mutually bonded together by the coextrusion.

The polyamide wall 2 has a wall thickness sufficient to prevent the swelling of the water-barrier layer 4 from causing any ultimate shape-change in the external dimensions of the line 1 and, especially in length changes thereof.

The outer diameter of the line 1 can be, by way of example, 8 mm and the wall thickness thereof about 1 mm. In any event, the polyamide wall 2, which can be composed of nylon 11 or nylon 12, should have a thickness of 0.75 to 1.25 mm and each of the coatings 3 and 4 can have a thickness about 10% of that of the polyamide wall. In the example, each of the coatings 3 and 4 has a thickness of about 0.1 mm.

Figure 3:
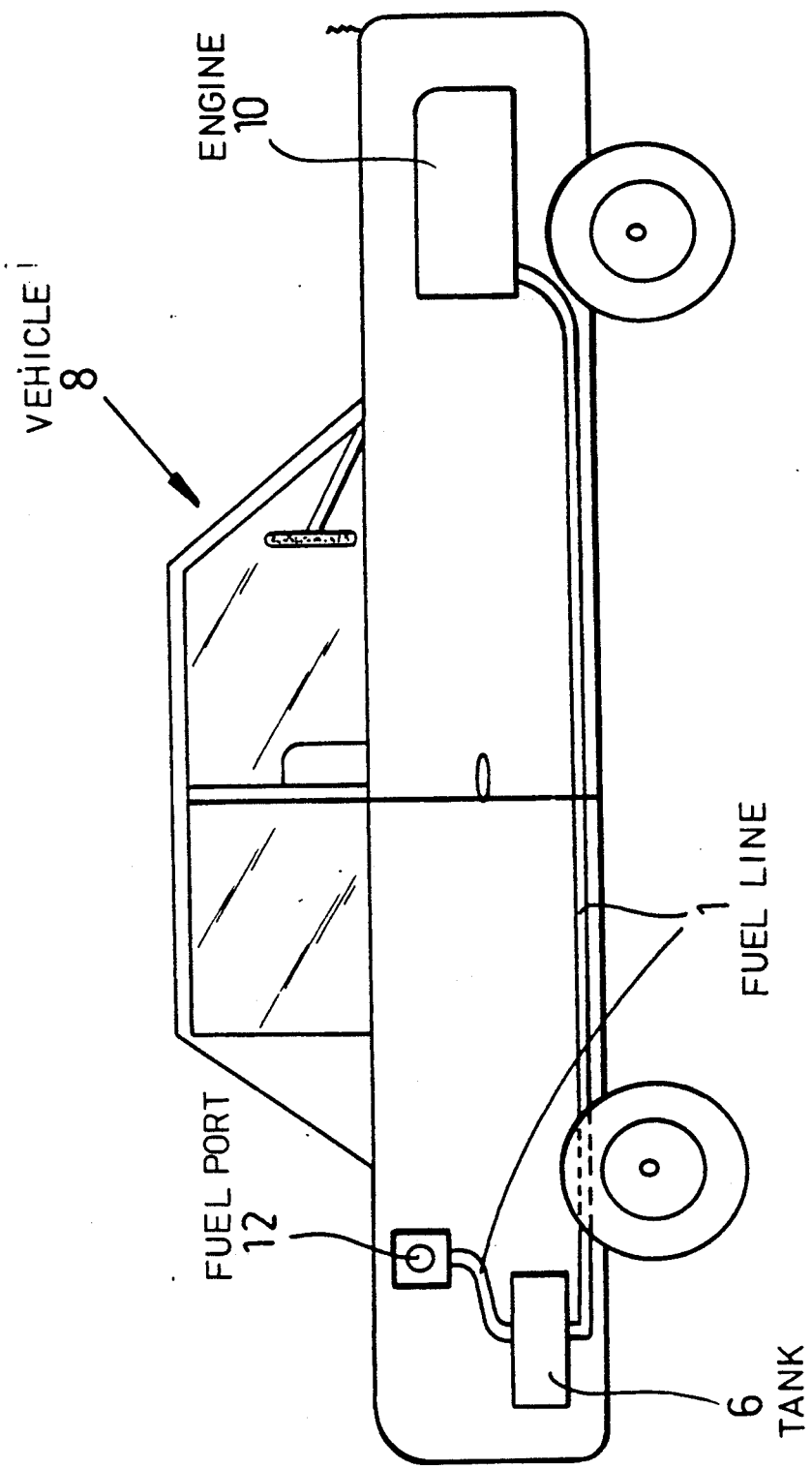
FIG. 3 is a highly diagrammatic, partially sectioned, view of a vehicle utilizing the fuel line according to FIG. 1 and the invention.

FIG. 3 depicts a vehicle 8 wherein the fuel line 1 of the present invention has been installed. Gasoline is pumped into vehicle 8 through fuel port 12. Fuel line 1 then delivers gasoline to tank. Engine 10 is then fed with gasoline through a further line 1 running from tank 6 into the engine.

I claim:

1. The combination with a vehicle fuel system for a vehicle adapted to operate on an alcohol-containing fuel of a fixed-length fuel line which consists of a polyamide wall internally lined with a polyvinyl alcohol based alcohol-barrier layer which is internally lined with a water-barrier layer selected from nylon 11 or nylon 12, said layers being bonded by coextrusion with one another and said wall, the polyamide wall having a thickness sufficient to prevent length changes in said fuel line resulting from swelling of said water-barrier layer.

2. The fuel line defined in claim 1 wherein said polyamide wall is composed of nylon 11 or nylon 12.

3. The fuel line defined in claim 1 wherein said alcohol-barrier layer is composed of an extrudable copolymer comprised substantially of polyvinyl alcohol.

4. The fuel line defined in claim 3 wherein said copolymer is a copolymer of vinyl alcohol and ethylene.

5. The fuel line defined in claim 1 wherein said water-barrier layer is composed of the same material as said wall.

6. The fuel line defined in claim 1 wherein said polyamide wall has a thickness of substantially 0.75 to 1.25 mm.

7. The fuel line defined in claim 6 wherein each of said layers has a thickness of substantially 10% of the thickness of said polyamide wall.

8. The fuel line defined in claim 6 wherein each of said layers has a thickness of substantially 0.1 mm.

9. The fuel line defined in claim 8 wherein said polyamide wall has a thickness of substantially 0.8 mm.

10. The fuel line defined in claim 9 wherein said line has an outer diameter of about 8 mm.

11. The fuel line defined in claim 1 wherein said polyamide wall is hard polyamide.

12. The fuel line defined in claim 1 wherein said polyamide wall is composed of a polyamide composition containing a plasticizer for polyamide whereby said line is flexible.

13. A method of preventing length-change in a fuel line for an automotive vehicle to be powered by alcohol-containing fuel which comprises the steps of lining a polyamide wall of said fuel line with a layer of polyvinyl alcohol based alcohol-barrier material and separating said alcohol-barrier material from the fuel in said line by a polyamide-water barrier of nylon 11 and nylon 12.

* * * * *